US008769674B2

(12) United States Patent
Repasi et al.

(10) Patent No.: US 8,769,674 B2
(45) Date of Patent: Jul. 1, 2014

(54) INSTANT MESSAGE SCANNING (75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1252 days.

(21) Appl. No.: 11/850,348

(22) Filed: Sep. 5, 2007

(65) Prior Publication Data
US 2008/0066180 A1 Mar. 13, 2008

Related U.S. Application Data (60) Provisional application No. 60/842,753, filed on Sep. 7, 2006.

(51) Int. Cl.
*G06F 12/14* (2006.01)
(52) U.S. Cl.
USPC ............................................ 726/22
(58) Field of Classification Search
USPC .................................... 726/22–25
See application file for complete search history.

(56) References Cited

U.S. PATENT DOCUMENTS

| 7,107,618 | B1* | 9/2006 | Gordon et al. ............ 726/24 |
| 2004/0111479 | A1* | 6/2004 | Borden et al. ........... 709/206 |
| 2006/0253458 | A1* | 11/2006 | Dixon et al. ............. 707/10 |
| 2007/0006026 | A1* | 1/2007 | Roychowdhary et al. ...... 714/12 |
| 2007/0083930 | A1* | 4/2007 | Dumont et al. ........... 726/24 |
| 2007/0169184 | A1* | 7/2007 | Krywaniuk ............. 726/11 |
| 2007/0226204 | A1* | 9/2007 | Feldman ............... 707/5 |
| 2008/0059295 | A1* | 3/2008 | Schauser et al. ......... 705/14 |
| 2008/0196099 | A1* | 8/2008 | Shastri ............... 726/12 |

* cited by examiner

Primary Examiner — Brandon Hoffman
(74) Attorney, Agent, or Firm — Holland & Hart LLP (57) ABSTRACT A method, system, computer program product, and/or a computer readable medium of instructions for detecting a malicious message for an instant messaging service. In one form, the method comprises: receiving a message in a first processing system; analyzing the message to determine if the message is malicious; and in response to detecting that the message is malicious, restricting the message from threatening: the first processing system; and a second processing system in data communication with the first processing system. In another form, the method comprises receiving, in a first processing system, input data indicative of an instruction to transfer a message to a second processing system; analyzing the message to be transferred to determine if the message is malicious; and in response to detecting that the message is malicious, restricting the message from being transferred to the second processing system.

15 Claims, 8 Drawing Sheets

INSTANT MESSAGE SCANNING

This application claims the benefit of priority from U.S. Provisional Patent Application No. 60/842,753 filed Sep. 7, 2006, which is incorporated by reference.

TECHNICAL FIELD

The present invention generally relates to the field of computing, and more particularly to a method, system, computer readable medium of instructions and/or computer program product for scanning a message utilising an instant message application.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

An entity can comprise, but is not limited to, a file, an object, a class, a collection of grouped data, a library, a variable, a process, and/or a device.

Traditionally, malware scanners attempt to detect threats, such as malicious files, stored in the hard drive of a user's processing system, or received via e-mail. However, more elaborate techniques are being used in order for a threat to avoid detection by the malware scanner such that the user's processing system can be compromised.

One such technique which potentially allows a threat to avoid detection is the use of instant messaging applications, such as for example MSN Messenger application by Microsoft™. The use of instant messaging applications has recently become popular amongst users of networked processing systems. Users of networked processing systems can communicate almost instantaneously with each other using such computer applications. Instant messaging applications generally allow the transfer of text, although, other forms of data such as files can also be transferred amongst users. However, the increased use of instant messaging applications has created a new opportunity allowing processing systems to be compromised with malware.

There exists a need for a method, system, computer readable medium of instructions, and/or a computer program product to identify a malicious message received and/or transferred using an instant messaging application, which addresses or at least ameliorates one or more problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

According to a first broad form there is provided a method of detecting a malicious message for an instant messaging service, wherein the method comprises:

receiving a message in a first processing system;

analysing the message to determine if the message is malicious; and in response to detecting that the message is malicious, restricting the message from threatening:
  the first processing system; and
  a second processing system in data communication with the first processing system.

In one form, the first processing system is a designated recipient of the message.

In another form, the first processing system is a server processing system, and the second processing system is a designated recipient of the message.

In one embodiment the method comprises scanning textual content of the message for a networked address which is associated with malicious activity, wherein in the event that the textual content of the message comprises the networked address associated with malicious activity, the message is determined to be malicious.

In another embodiment, the method comprises analysing an attached file of the message, wherein in the event that the attached file is determined to be malicious, the message is determined to be malicious.

In an optional form, restricting the message comprises at least one of:

blocking at least a part of the message;

alerting a user receiving the message that at least part of the message has been blocked;

alerting a user transferring the message that at least part of the message has been blocked;

modifying at least part of the message;

prompting a receiving user regarding detection of a threat and requesting the user to indicate whether the message is to be received;

closing an instant messaging session between transferring and receiving users;

closing an instant messaging interface of at least one of the transferring and receiving users;

removing a malicious portion of the message;

blocking a transferring user from transferring future messages to the receiving user; and removing the transferring user from a contact list of the receiving user.

Optionally, the method comprises:
  (a) setting at least part of the message as a base entity;
  (b) determining an entity property of the base entity;
  (c) determining one or more related entities to the base entity which are related by the entity property; and
  (d) performing an analysis of the related entities to determine one or more related entities to the malicious message.

In another form, the method comprises:

setting the one or more related entities as the base entity; and repeating steps (b) and (c), followed by step (d) until an end condition is satisfied.

In another broad form there is provided a system to detect a malicious message for an instant messaging service, wherein the system is configured to:
  receive a message in a first processing system;
  analyse the message to determine if the message is malicious; and
  in response to detecting that the message is malicious, restrict the message from threatening:
    the first processing system; and
    a second processing system in data communication with the first processing system.

In another broad form there is provided a computer program product comprising a computer readable medium having a computer program recorded therein or thereon, the computer program enabling detection of a malicious message for an instant messaging service, wherein the computer program product configures the processing system to:
  receive a message in a first processing system;
  analyse the message to determine if the message is malicious; and
  in response to detecting that the message is malicious, restrict the message from threatening:
    the first processing system; and
    a second processing system in data communication with the first processing system.

In another broad form there is provided a method of detecting a malicious message for an instant messaging service, wherein the method comprises:
  receiving, in a first processing system, input data indicative of an instruction to transfer a message to a second processing system;
  analysing the message to be transferred to determine if the message is malicious; and
  in response to detecting that the message is malicious, restricting the message from being transferred to the second processing system.

In one form, the method comprises intercepting a message transferal instruction indicated by a user interacting with the first processing system.

In another form, the method comprises scanning textual content of the message for a networked address which are associated with malicious activity, wherein in the event that the textual content of the message comprises the networked address associated with malicious activity, the message is determined to be malicious.

In one embodiment the method comprises analysing attached files of the message, wherein in the event that the attached file is determined to be malicious, the message is determined to be malicious.

In another embodiment, restricting the message comprises at least one of:
  blocking at least a part of the message;
  alerting a user receiving the message that at least part of the message has been blocked;
  alerting a user transferring the message that at least part of the message has been blocked;
  modifying at least part of the message;
  prompting a receiving user regarding detection of a threat and requesting the user to indicate whether the message is to be received;
  closing an instant messaging session between transferring and receiving users;
  closing an instant messaging interface of at least one of the transferring and receiving users;
  removing a malicious portion of the message;
  blocking a transferring user from transferring future messages to the receiving user; and
  removing the transferring user from a contact list of the receiving user.

In an optional form, the method comprises:
  (a) setting at least part of the message as a base entity;
  (b) determining an entity property of the base entity;
  (c) determining one or more related entities to the base entity which are related by the entity property; and
  (d) performing an analysis of the related entities to determine one or more related entities to the malicious message.

Optionally, the method comprises:
  setting the one or more related entities as the base entity; and
  repeating steps (b) and (c), followed by step (d) until an end condition is satisfied.

In another broad form there is provided a system to detect a malicious message for an instant messaging service, wherein the system is configured to:
  receive, in a first processing system, input data indicative of an instruction to transfer a message to a second processing system;
  analyse the message to be transferred to determine if the message is malicious; and
  in response to detecting that the message is malicious, restrict the message from being transferred to the second processing system.

In another broad form there is provided a computer program product comprising a computer readable medium having a computer program recorded therein or thereon, the computer program enabling detection of a malicious message for an instant messaging service, wherein the computer program product configures a first processing system to:
  receive input data indicative of an instruction to transfer a message to a second processing system;
  analyse the message to be transferred to determine if the message is malicious; and
  in response to detecting that the message is malicious, restrict the message from being transferred to a second processing system.

According to another broad form, there is provided a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Figure 1:
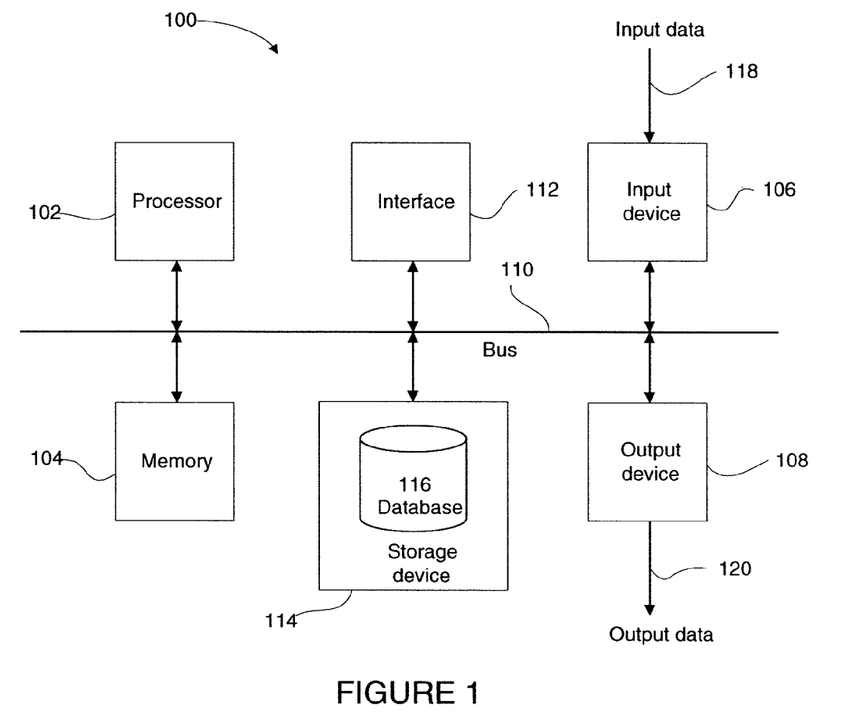
FIG. 1 illustrates a functional block diagram of an example processing system that can be utilised to embody or give effect to a particular embodiment.

A particular embodiment of the present invention can be realised using a processing system, an example of which is shown in FIG. 1. The processing system 100 illustrated in relation to FIG. 1 can be used as a client processing system 210, 230 and/or a server processing system 220.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

Figure 2:
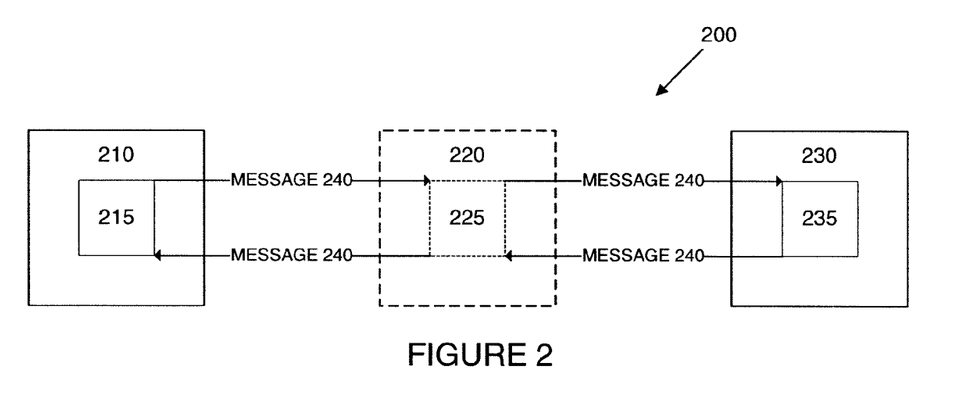
FIG. 2 illustrates a block diagram representing an example network comprising a number of client processing systems and an optional server processing system.

Referring to FIG. 2, the processing system 100 may be a part of a networked communications system 200. The processing system 100 could connect to network 200, for example the Internet or a WAN. The network 200 can comprise one or more client processing systems 210, 230 and optionally one or more server processing systems 220 wherein the one or more client processing systems 210, 230 and the one or more server processing systems 220 are forms of processing system 100. Input data 118 and output data 120 could be communicated to other devices via the network 200. The transfer of information and/or data over the network 200 can be achieved using wired communications means or wireless communications means. The server processing system 220 can facilitate the transfer of data between the network 200 and one or more databases. The server processing system 220 and one or more databases provide an example of an information source.

Referring still to FIG. 2, the client processing systems 210, 230 comprise an instant messaging application interface 215, 235. Messages 240 transferred between client processing systems 210, 230 can be transferred directly to each other, or via the optional server processing system 220 (as indicated by the dotted outline). If a server processing system 220 is provided in the network 200, the server processing system 220 can comprise an instant messaging server 225 which facilitates the receipt and transfer of messages between client processing systems 210, 230.

Figure 3:
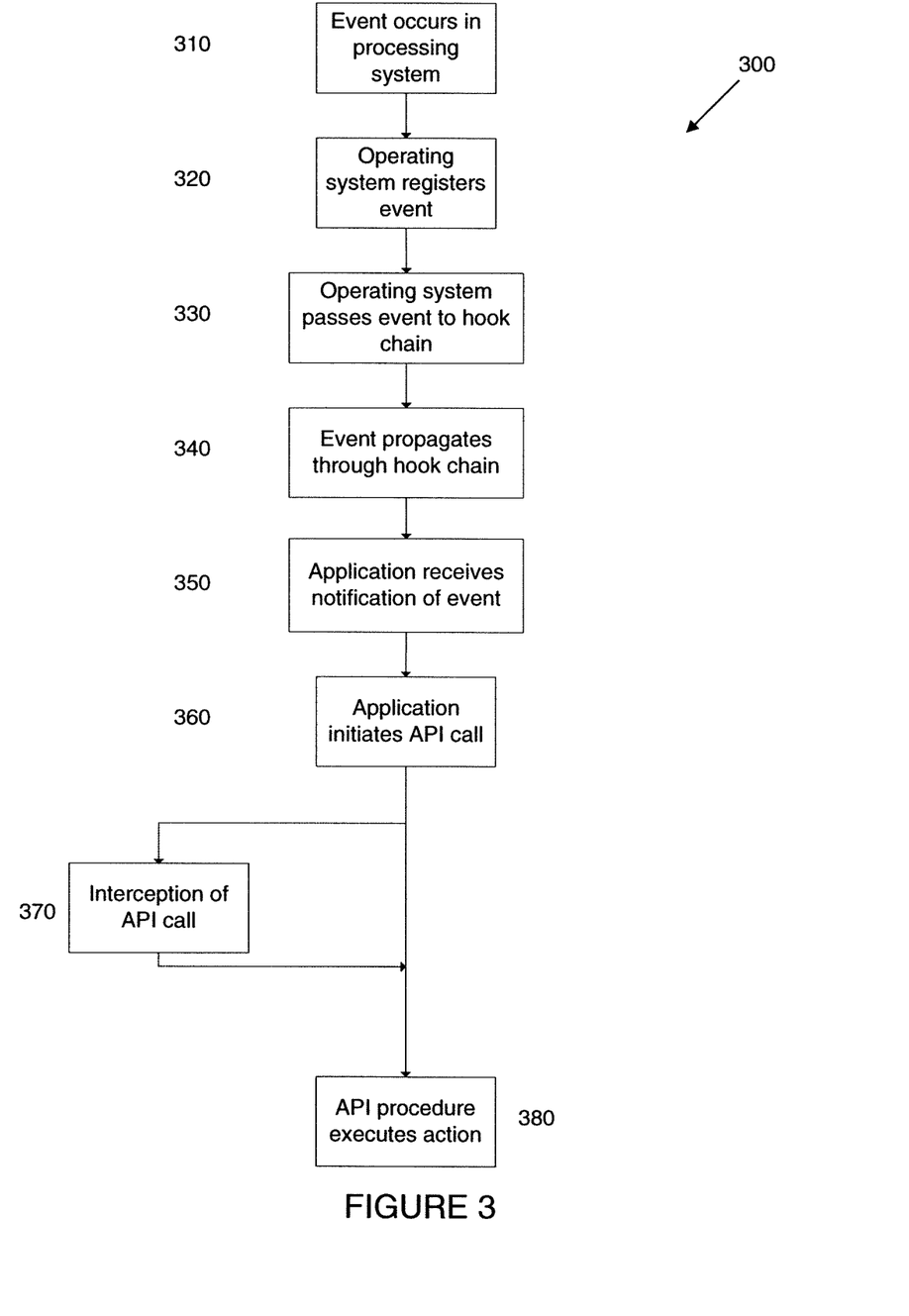
FIG. 3 illustrates a flow diagram representing an example method of intercepting an event in a processing system.

Referring to FIG. 3 there is shown an example of a method 300 of intercepting an activity in a processing system 100.

At step 310, an event occurs in the processing system 100. At step 320, an operating system running in the processing system 100 registers the occurrence of the event. At step 330, the operating system passes the registered event to the hook chain. At step 340, the event is passed to each hook in the hook chain such that different applications, processes, and devices may be notified of the registered event. Once the event has propagated throughout the hook chain, the method 300 comprises at step 350 an application receiving notification of the event being registered by the processing system 100.

At step 360, the method 300 comprises the application initiating an API call to an API procedure so as to carry out a response to the registered event, wherein the response may be the execution of the action. If an API hook has been established between the API call and the API procedure, the API call is intercepted before it reaches the API procedure at step 370. Processing can be performed by an API hook function once the API call has been intercepted prior to the API procedure being called. The API call may be allowed to continue calling the API procedure at step 380 such that the action 230 is performed.

Figure 4:
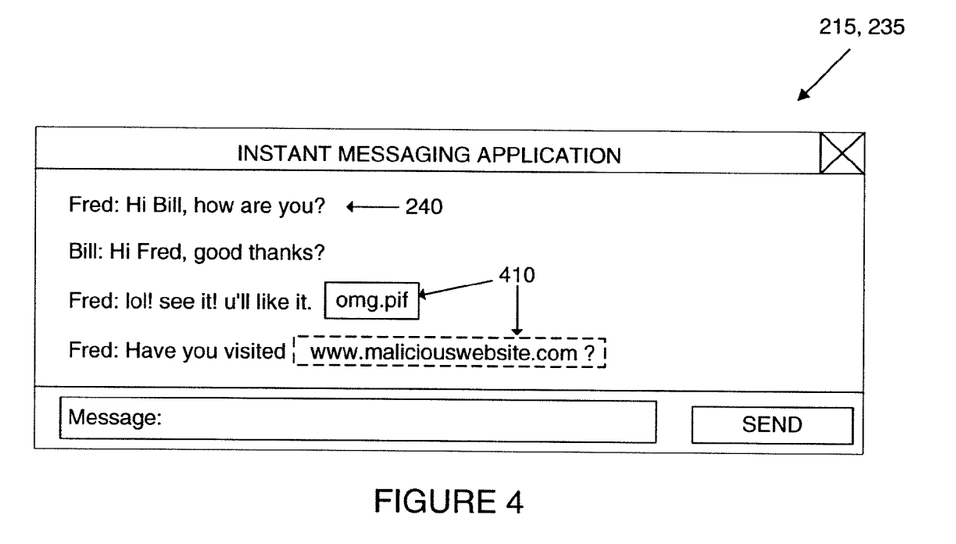
FIG. 4 illustrates a block diagram representing an example instant messaging application interface.

Referring now to FIG. 4, there is shown an example instant messaging interface 215, 235 of an instant messaging application. In particular, the interface 215, 235 comprises a number of messages 240 sent between communicating processing systems 210, 230. It will be appreciated that generally a user interacts with the interface 400 of the application to transfer a message. However, in some forms, malware may maliciously masquerade as a user by interacting with the instant messaging application so as to fool other users into trusting data transferred, such as to compromise one or more networked processing systems 210, 230.

Messages 240 can comprise one or more entities of interest 410 which are suspected of being malicious. Entities of interest 410 can comprise, but is not limited to, a URL and an attached file. Entities of interest 410 are analysed to determine if the message is malicious. A restricting action can be performed in response to determining that the message 240 is malicious, as will be further explained below.

Figure 5:
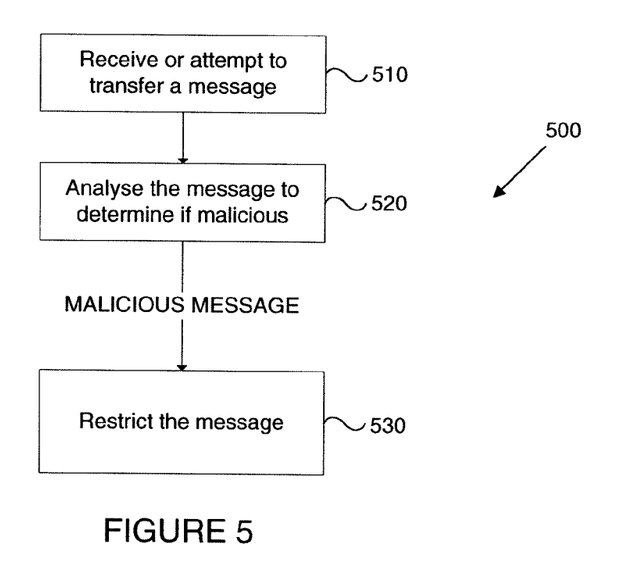
FIG. 5 illustrates a flow diagram representing a method of detecting a malicious message.

Referring now to FIG. 5, there is shown a flow diagram illustrating an example method of detecting a message 240 which is malicious.

In particular, at step 510, the method 500 comprises the processing system 100 receiving or attempting to transfer a message 240. At step 520, the method 500 comprises analysing the message 240 to determine if the message 240 is malicious. In response to the message 240 being identified as being malicious, the method 500 comprises, at step 530, restricting the message 240, thus restricting malicious activity being performed in the processing system 100.

Figure 6:
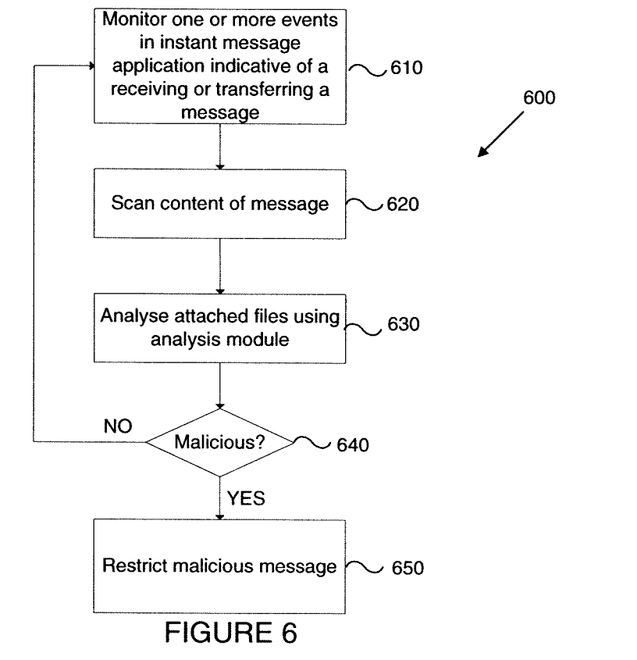
FIG. 6 illustrates a more detailed flow diagram of the example method in FIG. 5.

Referring now to FIG. 6, there is shown a flow diagram illustrating a more detailed flow diagram of method described in relation to FIG. 5.

In particular, method 600 utilises a technique of listening for a receiving event in the instant messaging application. At step 610, the method 600 comprises monitoring one or more events indicative of the instant messaging service receiving a message 240. This may be performed using listening modules which listen for particular events occurring in the instant messaging application.

At step 620, the method 600 comprises scanning the textual content of the message 240 to determine if the message 240 is malicious. This scanning process can be performed using an analysis module 900, as will be described in more detail below. In some forms, the textual content may be scanned for URLs associated with malicious websites which may potentially infect the processing system 100 with malware if the malicious website is visited using an Internet browser application.

At step 630, the method 600 comprises analysing any attached files of the message 240. Again, this can be performed using the analysis module 900.

It will be appreciated that steps 620 and 630 do not both necessarily need to be performed together. In one form, only step 620 need be performed, such that step 630 is not performed. In an alternative form, step 630 can be performed, and step 620 is not performed. In a further form, both steps 620 and 630 are performed. In another form, the user can define whether step 620 and/or step 630 are performed by the system.

At step 640, if the message 240 is determined to be malicious, the method 600 proceeds to step 650. If the message 240 is determined to be non-malicious, the method 600 proceeds back to step 610 to continue monitoring events.

At step 650, the method 600 comprises restricting the malicious message. This can comprise at least one of:

Blocking at least a portion of the message 240;
Alerting the receiving user of the blocked message 240;
Alerting the transferring user of the blocked message 240;
Modifying the message 240 such that only a portion of the message 240 is displayed;
Modifying the message 240 with information regarding why at least a portion of the message 240 was blocked;
Notifying the receiving or transferring user of the detection of the malicious message 240;
Prompting the receiving user regarding whether the message 240 should be blocked or displayed;
Closing the instant messaging session between the users;
Closing the instant messaging interface 215, 235;
Removing a malicious portion of the message 240;
Blocking the transferring user from transferring future messages 240 to the receiving user; and
Removing, from the receiving user's contact list, the transferring user.

The user may define a particular mode which the system is to operate which implements one or more of the above restricting actions.

It will be appreciated that although method 600 listens for a receiving event, method 600 can be adapted to listen for the receipt of input data indicative of an instruction to transfer the message 240 from a first processing system 210 to a second processing system 230. In one form, the input instruction may be the user clicking a "SEND" button on the instant messaging interface 215, 235 such as to transfer the message to the another processing system. In this instance, the message 240 is analysed prior to transferal of the message 240 to the other processing system.

Figure 7:
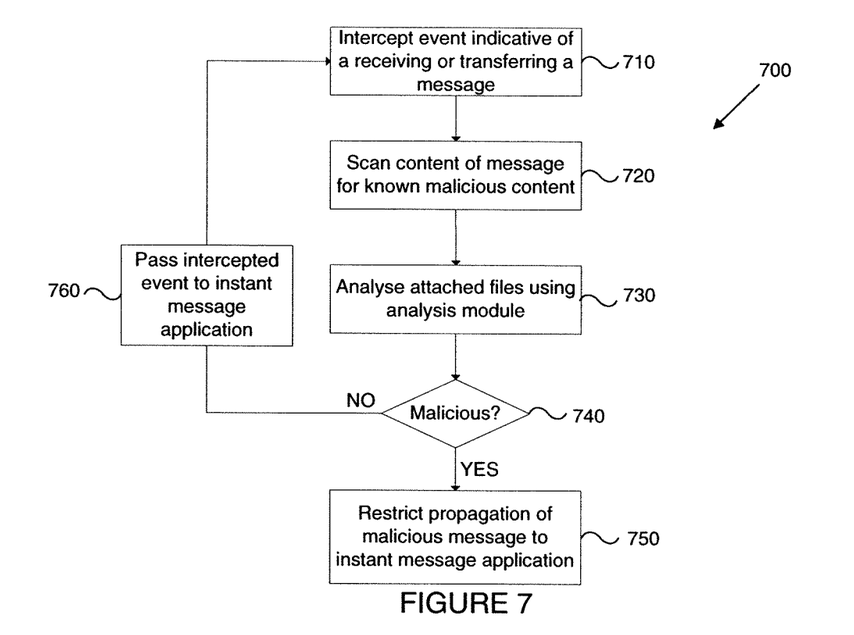
FIG. 7 illustrates a more detailed flow diagram of the example method in FIG. 5.

Referring now to FIG. 7, there is shown an example method of detecting a malicious message using interception. In particular at step 710, the method 700 comprises intercepting an event indicative of the receipt of network traffic. In some forms, the method 700 more specifically comprises intercepting an event indicative of the receipt of a message 240. The interception of an event can be performed in accordance with the method 300 described in relation to FIG. 3. Steps 720 and 730 correspond to steps 620 and 630 of method 600. At step 740, if based on the results of the analysis module 900, the message 240 is determined to be malicious, the method 700 proceeds to step 750 which corresponds to step 650. However, if the results of the analysis module 900 indicate that the message is non-malicious, the method 700, at step 760, comprises passing the event to the instant messaging application, such that the message 240 can be provided to the user.

Figure 8:
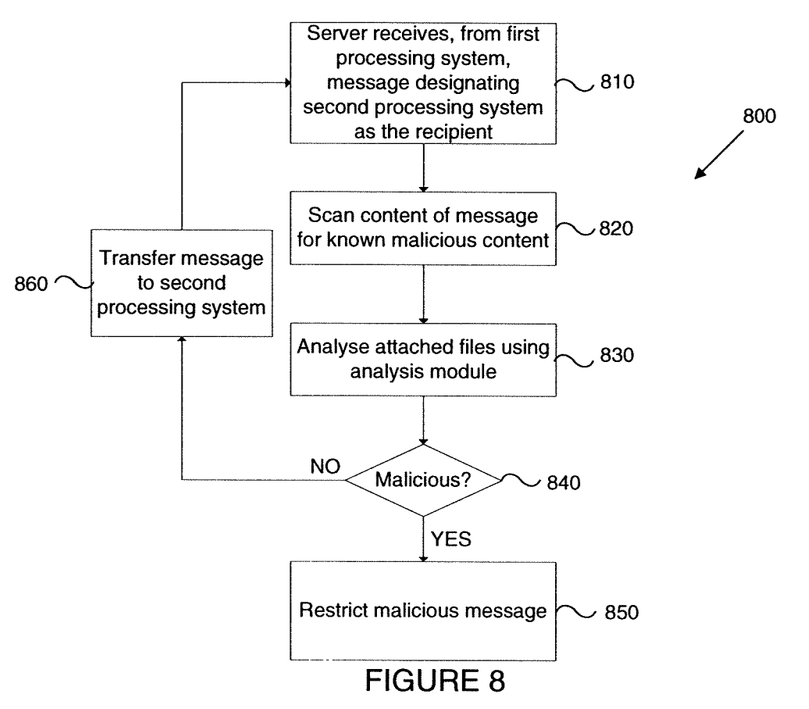
FIG. 8 illustrates a more detailed flow diagram of the example method in FIG. 5.

Referring now to FIG. 8, there is shown an example method of detecting a malicious message at the server processing system 220 which facilitates the transfer of messages 240 between the client processing systems 210, 230.

In particular, at step 810, the method 800 comprises the server processing system 220 receiving a message 240 from a first client processing system 210, wherein the message 240 designates a second processing system 230 as the recipient. Steps 820, 830, 840, and 850 correspond to steps 620, 630, 640, and 650. If the message 240 is determined to be malicious, the server processing system 220 attempts to restrict the message 240 from allowing malicious activity to be performed at the second processing system 230. This can comprise any one of the above listed restricting actions discussed in relation to step 650. If the message 240 is determined to not be malicious, the method 800, at step 860, comprises transferring the message 240 to the second processing system 230.

Figure 9:
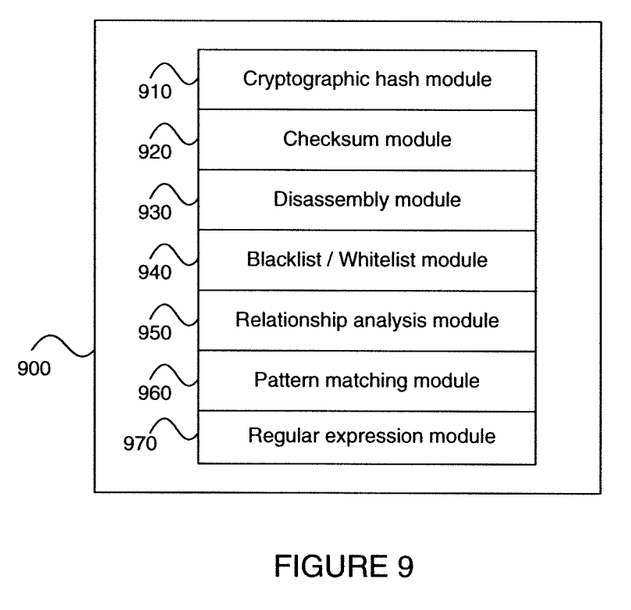
FIG. 9 illustrates a block diagram representing an example of an analysis module.

As shown in FIG. 9, the analysis module 900 can comprise a number of sub-modules to determine if the entity of interest 410 of the message 240 is malicious.

In particular, the analysis module 900 can comprise the sub-modules of a cryptographic hash module 910, a checksum module 920, a disassembly module 930, a black-list/ white-list module 940, a relationship analysis module 950, a pattern matching module 960, and a regular expression module 970. The analysis module 900 can be configured to use one or more of these sub-modules exclusively or in combination to determine if the entity of interest 410 of the message 240 is malicious.

The cryptographic hash module 910 of the analysis module 900 is configured to generate a cryptographic hash value of the entity of interest 410. As the cryptographic hash value can be used as an identity, the cryptographic hash value can be used in comparisons with the blacklist/whitelist module 940 to determine whether the entity of interest 410 is malicious.

The checksum module 920 of the analysis module 900 is configured to determine a checksum of the entity of interest 410. The checksum can be compared to a database (blacklist/whitelist module 940) to determine whether the entity of interest 410 is malicious.

The pattern matching module 960 of the analysis module 900 is configured to search the entity of interest 410 for particular patterns of strings or instructions which are indicative of malicious activity. The pattern matching module 960 may operate in combination with the disassembly module 930 of the analysis module 900.

The disassembly module 930 is configured to disassemble binary code of the entity of interest 410 such that the disassembly module 930 determines processing system instructions for the entity of interest 410. The processing system instructions of the entity of interest 410 can then be used by the pattern matching module 960 to determine whether the entity of interest 410 of the message is malicious. Although strings of instructions can be compared by the pattern matching module 1260, the pattern matching module 960 may be configured to perform functional comparisons of groups of instructions to determine whether the functionality of the entity of interest 410 is indicative of malware.

The blacklist/whitelist module 940 of the analysis module 900 comprises a list of malicious and/or non-malicious entities. The blacklist/whitelist module 940 may be provided in the form of a table or database which comprises data indicative of malicious and non-malicious entities. The table may comprise checksums and cryptographic hash values for malicious and non-malicious entities. The data stored in the blacklist/whitelist module 940 can be used to determine whether the entity of interest 410 is malicious or non-malicious.

The relationship analysis module 950 can be used to determine a group of related suspicious entities relative to the entity of interest 410 of the message 240. The group of related suspicious entities can then be analysed to determine whether one or more of the suspicious related entities are malicious. A more detailed description is provided below regarding the determination of the group of related suspicious entities relative to the entity of interest 410 of the message 240. A detailed explanation of detecting one or more related entities is described in the Applicant's co-pending U.S. patent application Ser. No. 11/707,425 and co-pending Australian Patent application AU2007200605 entitled "Determination of related entities", the content of which is herein incorporated by cross-reference.

The regular expression module 970 comprises a number of regular expressions which can be applied to the message to determine if the message 240 comprises one or more entities of interest 410. For example, the regular expression module 970 may scan the textual content of the message 240 to determine if known malicious URLs are being transferred. These URLs could comprise any one of: web sites which exploit a vulnerability in common operating systems to install malware; web sites which masquerade as a legitimate business and prompt the user to provide personal information; and web sites which redirect the user to downloadable executable files which contain malware.

Generally, malware comprises a bundle of malicious entities. By only considering a single entity by itself, it may not be accurately possible to determine if the entity of interest 410 is malicious. However, by determining related entities relative to the entity of interest, a more accurate assessment can be made in relation to whether or not entity of interest is malicious. Furthermore, removing a single malicious entity may not necessarily disable the malware from performing some malicious activity. Some particular forms of malware can perform repairs in relation to a single malicious entity being removed or disabled. Therefore, detecting a group of related entities can be beneficial for disabling malware.

Figure 10:
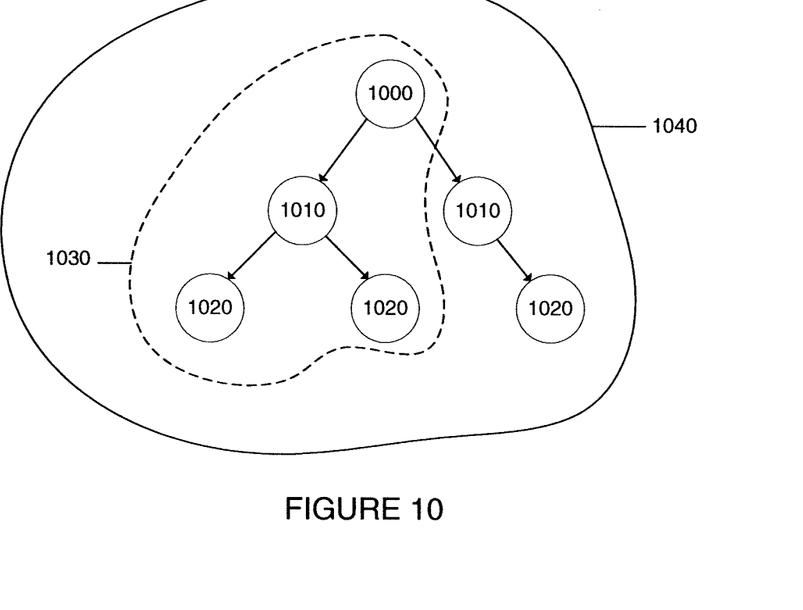
FIG. 10 illustrates a block diagram representing an example of determining a group of related suspicious entities relative to an entity of interest of a message.

As shown by example in FIG. 10, the entity of interest 410 can be set as a starting entity 1000. A number of related entity rules can be applied to determine one or more related entities 1010, 1020 relative to the starting entity 1000. Each related entity 1010, 1020 determined can subsequently be set as another starting entity 1000, wherein new related entities are determined for the new starting entity, such that a larger web of related entities relative to the entity of interest 410 is determined. The application of the related entity rules results in the group of related entities 1040, comprising the starting entity 1000 representing the entity of interest 410, relative to the starting entity 1000. The related entity rules can be configured to determine a group of related suspicious entities 1040 relative to the entity of interest 410, such that an analysis of the group of related suspicious entities 1040 can be applied to determine whether a portion 1030 of the group of related suspicious entities 1040 is malicious. Alternatively, the related entity rules can be configured to determine, outright, related malicious entities 1030 relative to the entity of interest 410.

Figure 11:
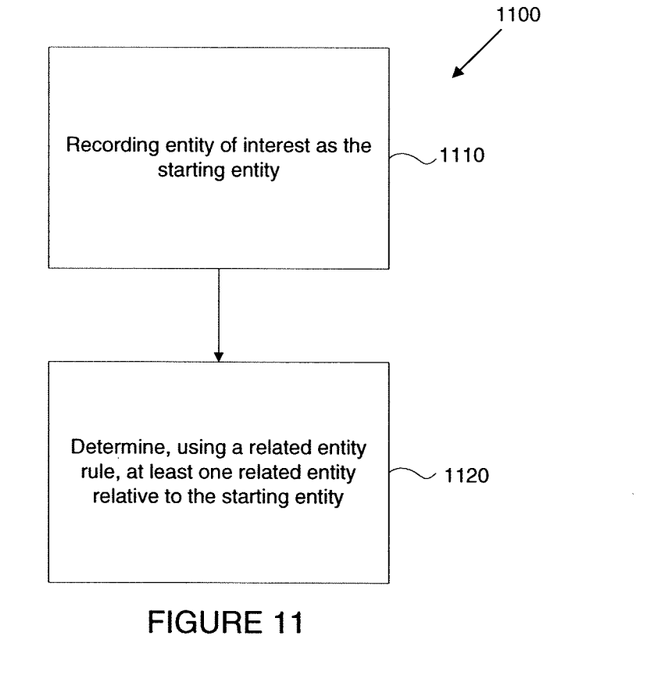
FIG. 11 illustrates a flow diagram representing an example method of determining a group of related entities.

Referring now to FIG. 11, there is illustrated a flow diagram illustrating an example method 1100 of determining a group of related entities 2000 in a processing system 810.

In particular, at step 1110 the method 1100 comprises recording the entity of interest 410 as the starting entity 1000. At step 1120, the method 1100 comprises determining, using one or more related entity rules, at least one related entity 1010 relative to the starting entity 1000.

Figure 12A:
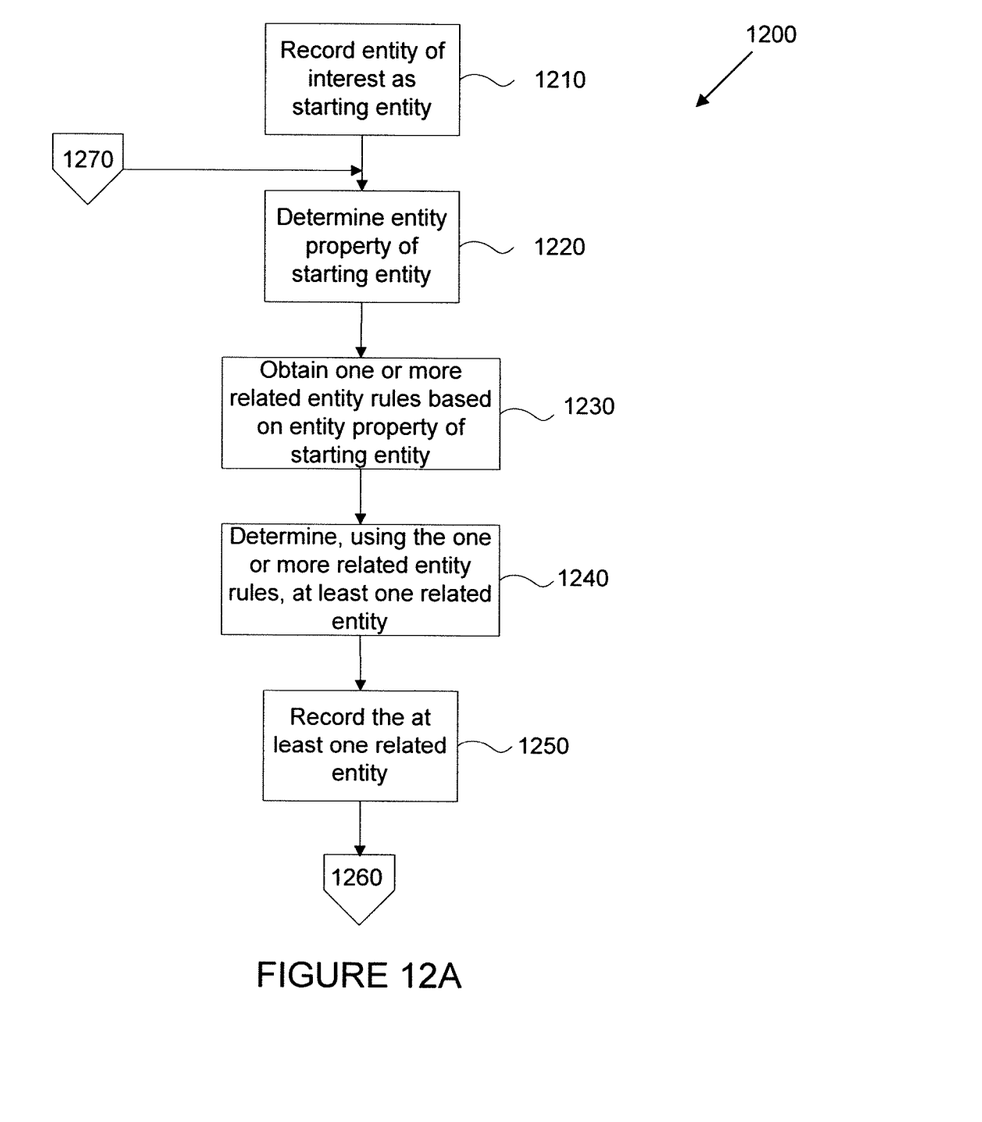
FIGS. 12A and 12B illustrate a more detailed flow diagram of the example method in FIG. 11.
Figure 12B:
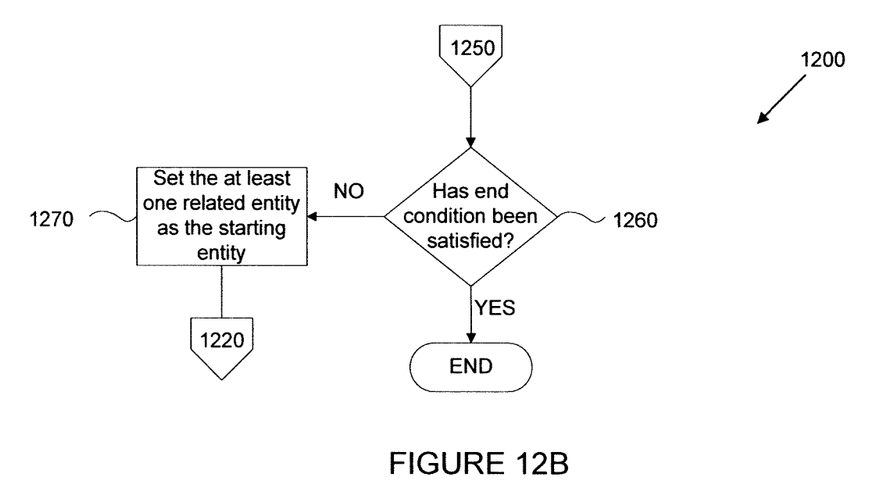

Referring now to FIGS. 12A and 12B, there is shown a method 1200 of determining a group of related suspicious entities relative to the entity of interest 410. It will be appreciated that method 1200 can be adapted to determine any form of related entities, such as non-malicious, or trusted, entities relative to the entity of interest 410.

At step 1210, the method 1200 comprises recording the entity of interest 410 as the starting entity 1000. This generally comprises the processing system 100 recording the starting entity 1000 in the processing system memory, such as a data store. The starting entity 1000 may be stored in the form of a table or list.

At step 1220, the method 1200 comprises determining an entity property associated with the starting entity 1000. The entity property may be an entity type of the entity, such as whether the starting entity 1000 is an executable entity, a run key entity or a dynamic linked library entity. The entity property may comprise a time that the starting entity 1000 was created or modified. The entity property may comprise the directory which the starting entity 1000 is contained within. The entity property may be a vendor name associated with the starting entity 1000. The entity property may be a particular network address from which the starting entity 1000 was downloaded.

It will be appreciated that more than one entity property may be determined for the starting entity 1000. However, for the purposes of simplicity, throughout this example it will be assumed that one entity property has been determined for the starting entity 1000.

At step 1230, the method 1200 comprises obtaining, based on the entity property of the starting entity 1000, one or more related entity rules. In this particular example, the one or more related entity rules take the form of one or more rules for determining suspicious entities related to the starting entity 1000. Step 1230 may comprise selecting, based on the entity property, the one or more related entity rules from a larger set of related entity rules. Each related entity rule is associated with a particular entity property, and as such, a selection of a related entity rules can be performed based on the entity property of the starting entity 1000. An example list of entity properties and corresponding related entity rules is shown below in List 1.

I. if the starting entity comprises a vendor name, the at least one suspicious related entity is one or more entities comprising the same vendor name;

II. if the starting entity comprises a product name, the at least one suspicious related entity is one or more entities comprising the same product name;

III. if the starting entity comprises a version name, the at least one suspicious related entity is one or more entities comprising the same version name;

IV. if the starting entity was created at a particular time in the one or more processing systems, the at least one suspicious related entity is one or more entities which were created at a similar time to that of the starting entity;

V. if the starting entity accesses a particular network address or network address range or network address names, the at least one suspicious related entity is one or more entities which also access the same particular network address or network address range or network address names.

VI. if the starting entity accesses a particular network address or network address range, the at least one suspicious related entity is the particular network address or network address range or network address names.

VII. if the starting entity causes another process to execute, the at least one suspicious related entity is one or more entities which was executed by it.

VIII. if the starting entity was executed by a process, the at least one suspicious related entity is one or more entities which executed the starting entity.

IX. If the starting entity creates or modifies an entity, the at least one suspicious related entity is one or more entities which it creates or modifies.

X. If the starting entity is found in a directory not in a list of whitelist directories, the at least one suspicious related entity is one or more entities which also exist in the same directory.

XI. If the starting entity is downloaded from the internet/tcpip, the at least one suspicious related entity is one or more entities which were downloaded at the same time or by the same process or from the same particular network address or network address range or network address names.

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
|---|---|
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names assocaiated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |

TABLE 1-continued

Further example of Entity Properties and corresponding related entity rules

| Entity Property | Related Entity Rule |
| --- | --- |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one or more executable entities executed by the starting entity |
| Cookie entity | The one or more suspicious related entities are one or more network addresses or network address ranges or network address names associated with the starting entity |
| windows instance entity | The one or more suspicious related entities are one or more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one or more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant suspicious related entity rules.

It will also be appreciated from Table 1 that more than one related entity rule can be obtained based on the one or more entity properties of the starting entity. As shown above in Table 1, if the entity property indicates that the starting entity 1000 is an executable entity, then nine separate types of related entity rules can be applicable for determining the related suspicious entities relative to the starting entity 1000.

Additionally or alternatively, the processing system 210, 230 may transfer, to a server processing system 220, one or more entity properties of the starting entity 1300, and receive, from the server processing system 220, the one or more related entity rules. In this step, the server processing system 220 may select the one or more related entity rules using the entity property from a server set of related entity rules, and then transfer the one or more related entity rules to the processing system 210, 230.

At step 1240, the method 1200 comprises determining, using the one or more related entity rules, the at least one related suspicious entity 1010. For simplicity purposes, the following example is presented using one related entity rule, however, it will be appreciated that more than one related entity rule can be used. Using an example starting entity 1000 of "Spywarz.exe" which has a vendor name of "Spywarz Software Enterprises", the following related entity rule can be obtained:

"The one or more related entities have a vendor name equalling Spywarz Software Enterprises".

This related entity rule is then used to determine any entities in the processing system 100 which satisfy this rule. Once a scan has been performed using the related entity rule, it is determined that "Spywarz.dll" also shares a vendor name of "Spywarz Software Enterprises". As the related entity rule has been satisfied, "Spywarz.dll" is considered a related suspicious entity relative to the starting entity 1000 "Spywarz.exe". As such, a group of suspicious related entities 1000, 1010 has been determined which comprises "Spywarz.exe" and "Spywarz.dll".

Optionally, weighted values may be associated with the related entity rules.

Steps 1210 to 1240 represent a single iteration to determine a group of related suspicious entities 1010, 1020. However, if a more detailed group of related suspicious entities is required, it is possible to perform multiple iterations, as will now be discussed.

At step 1250, the at least one related entity 1010, 1020 is recorded. This may involve adding the at least one related suspicious entity 1010 to a list or a table which comprises the starting entity 1000 recorded at step 1210. Furthermore, the list or table may comprise data indicative of the relationship between the at least one related entity 1010 and entities which have been previously recorded. For example, in regard to entity 1000 and 1010, there is a direct link between the two entities 1000, 1010 based on a common vendor name.

At step 1260, comprise the method 1200 comprises determining if an end condition has been met. For example, the end condition may be satisfied when no new related entities are determined; when no other related entities are determined in a period of time; when the current starting entity has an entity type which is indicative of the end condition; and/or when a selected number of repetitions have been performed. If the end condition has not been met, the method proceeds to step 1270.

At step 1270, the method comprises setting the at least one related entity 1010 as the starting entity 1000. This may be performed in memory by reassigning the value of the starting entity 1000. By setting the at least one related entity 1010 as the starting entity 1000, steps 1220 to 1250 can be repeated until an end condition is met, as will be discussed in more detail below. As will be appreciated from FIG. 10, in this example, there are now two starting entities due to two related entities 1010 being determined in the first iteration. The method then proceeds back to step 1220, therefore determining the related entities 1020 for the newly set starting entity 1000. As such, a web of related entities representing the group of related suspicious entities 1040 is determined until the end condition is met.

Once the end condition is satisfied, the determination of the group of suspicious related entities 1040 has been completed. Optionally, the recordings can be displayed using a processing system 100. The group of related entities 1040 may be presented in a tabular form or may be presented in a graphical representation. Additionally, the group of related entities 1040 may presented indicating direct or indirect links between entities in the group. For example, "Spywarz.exe" and "Spywarz.dll" for the above example would have a direct link. However, if a subsequent related entity to "Spywarz.dll" was determined to be a system variable "SPYWARZ_VARIABLE", then there would be an indirect link between "Spywarz.exe" and "SPYWARZ_VARIABLE".

As will be appreciated from the example described in relation to FIGS. 12A and 12B, a group of related suspicious entities has been determined, wherein it is not necessarily the case that all of the suspicious entities are malicious. A further step of analysing the group of related suspicious entities can be performed to determine a portion of the group which is malicious.

Figure 13:
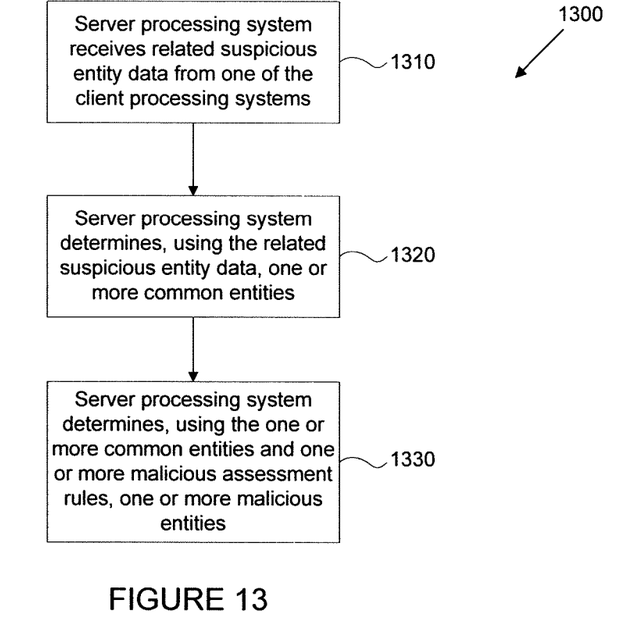
FIG. 13 illustrates a flow diagram representing an example method performed by a server processing system of determining one or more malicious entities based on a group of related suspicious entities.

Referring now to FIG. 13 there is shown a flow diagram illustrating an example method 1300 of determining a malicious portion of a group of related suspicious entities.

In particular, at step 1310 the method 1300 comprises receiving, in the server processing system 220, the related suspicious entity data indicative of the group of related suspicious entities from one of the client processing systems 210, 230. The related suspicious entity data may comprise measurements and/or properties associated with each suspicious related entity in the group 1040. Additionally or alternatively, the related suspicious entity data may be the actual entities which are transferred from the one or more client processing systems 210, 230 to the server processing system 220. The server processing system 220 may also receive a suspicion identifier indicative of behaviour associated with the suspicious entities. For example, the suspicious identifier may be indicative of the suspicious entities being associated with a pop-up window being displayed at the client processing system 210, 230 at regular intervals. The suspicious related entity data may also comprise data indicating the starting entity 1000 in the group 1040.

At step 1320, the server processing system 220 determines, using the related suspicious entity data, one or more common suspicious entities. This step comprises determining if the related suspicious entity data received from the client processing system 210, 230 comprises one or more suspicious entities in common with other records of related suspicious entity data received from other client processing systems 210, 230. If suspicion identifiers were received from the client processing systems 210, 230 in relation to the related suspicious entity data, the server 220 may use the suspicion identifier to narrow the selection of common suspicious entities. By determining the common suspicious entities, the risk of a false positive detection of a malicious entity which is actually non-malicious is reduced, thus providing a more accurate analysis.

At step 1330, the method 1300 comprises the server processing system 220 analysing the one or more common suspicious entities to determine one or more malicious entities. The server processing system 220 can comprise a malicious assessment module configured to determine whether one or more of the common suspicious related entities are malicious.

The malicious analysis module can comprise a set of malicious assessment rules to determine a level of maliciousness of the common suspicious related entities. The level of maliciousness can then be compared to a maliciousness limit, and in the event of a successful comparison, at least some of the common suspicious related entities are identified as malicious.

In one form, if a common suspicious entity satisfies a particular malicious assessment rule, the common suspicious entity is associated with a value or weight indicating how malicious the entity is considered. If the same common suspicious entity satisfies a number of particular malicious assessment rules, the values or weights associated with the entity are totaled. The total value or weight can be compared to a maximum limit to determine whether the common suspicious related entity is a malicious entity.

The malicious assessment rules are generally considered to be a stricter set of rules comparatively to the related entity rules used at the client processing system 210, 230. The related entity rules can be used as a first filter. The determination of common suspicious related entities can then be used as a second filter. The malicious assessment rules can then be used as a third filter to determine a malicious entity.

As the malicious assessment rules are generally more complex and considered more complete comparative to the related entity rules, a number of the suspicious entities may not satisfy the malicious assessment rules and are therefore not identified as malicious. The remaining common suspicious entities which satisfy the malicious assessment rules are identified as being malicious to the one or more client processing systems.

Optionally, at step 1340, the method 1300 comprises recording the malicious entities in a database of the server 220. Once the one or more malicious entities have been determined, actions can be performed in order to restrict malicious activity being performed in the processing system 210, 230 associated with the one or more malicious entities.

An example piece of pseudocode for implementing a method of detecting a malicious message is provided below:

```
010 Procedure Eventhandler OnMessage(message)
020 Begin
030    If NOT database_initialized( ) Then Begin
040       CALL initialize_database(regular_expressions);
050    End;
060    If message.dataType == TEXT Then Begin
060       For each expression in regular_expressions do Begin
070          if execute_regex(message.data, expression) Then Begin
080             bMatched = TRUE;
090             break;
100          end;
110       End;
120    End Else Begin
130       bMatched = scan_binary_data(message.data);
140    End;
150    if bMatched Then Begin
160       CALL alert_user(CURRENT_MODE);
170    End;
180 End;
```

Embodiments may be implemented separately as stand-alone software or in combination with currently known systems/methods as a software package. When embodiments are embodied as a software package, this software package also can be used to detect and remove malware from a processing system or device, such as a computer, computer system, PDA, mobile or cellular telephone, or a wide variety of other similar devices. In other forms, embodiments may be implemented as a hardware module which functionally cooperates with the processing system 100. In alternative forms, the embodiments may be implemented using a combination of hardware and software.

Optionally, the one or more processing systems may receive, one or more updated related entity rules and/or one or more updated suspicious assessment rules. The one or more processing systems may receive the updated rules from the server processing system or via a data store such as a compact disk or the like. The one or more processing systems can then update the existing rules with the updated rules.

In one form, statistical processes, fuzzy logic processes and/or heuristical processes can be used in combination with the related entity rules and/or the malicious assessment rules to determine whether a rule has been satisfied.

In another variation, the system and method may utilise an event watch list which monitors if previously determined starting entities 1000 are triggered by an event. In response to a previously determined starting entity 1000 being triggered by an event, the method herein described is re-performed for this particular starting entity 1000 to determine any suspicious and malicious entities related to the starting entity 1000.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, or an embodiment combining software and hardware aspects.

The claims defining the invention are as follows:

1. A method of detecting a malicious message for an instant messaging service, wherein the method comprises:
   (a) originating a message in an instant messaging client application included in a first processing system, wherein the message comprises an entity of interest, and wherein a second processing system is a designated recipient of the message;
   (b) prior to transferring a portion of the message from the instant messaging client application, analyzing, by the first processing system, the entity of interest to determine if the message is malicious, wherein a malicious entity of interest is configured to cause damage to the first processing system and the second processing system;
   (c) in response to detecting that the message is malicious, restricting the message from threatening:
      the first processing system; and
      the second processing system in data communication with the first processing system;
   (d) setting the entity of interest as a base entity;
   (e) determining an entity property of the base entity;
   (f) establishing at least one related entity rule based on the entity property of the base entity;
   (g) scanning the first processing system to locate an entity that satisfies the at least one entity rule;
   (h) in response to locating an entity that satisfies the at least one related entity rule, classifying the entity as a related entity to the base entity; and (i) in response to detecting that at least a portion of the message is malicious, removing the malicious portion of the message.

2. The method according to claim 1, wherein the first processing system is a server processing system, and the second processing system is a designated recipient of the message.

3. The method according to claim 1, wherein the method comprises scanning textual content of the message for a networked address which is associated with malicious activity, wherein in the event that the textual content of the message comprises the networked address associated with malicious activity, the message is determined to be malicious.

4. The method according to claim 1, wherein the method comprises analysing an attached file of the message, wherein in the event that the attached file is determined to be malicious, the message is determined to be malicious.

5. The method according to claim 1, wherein restricting the message comprises at least one of:
   blocking at least a part of the message;
   alerting a user receiving the message that at least part of the message has been blocked;
   alerting a user transferring the message that at least part of the message has been blocked;
   modifying at least part of the message;
   prompting a receiving user regarding detection of a threat and requesting the user to indicate whether the message is to be received;
   closing an instant messaging session between transferring and receiving users;
   closing an instant messaging interface of at least one of the transferring and receiving users;
   blocking a transferring user from transferring future messages to the receiving user; and
   removing the transferring user from a contact list of the receiving user.

6. The method according to claim 1, wherein the method comprises:
   setting the related entity as the base entity; and
   repeating steps (e), (f), and (g), followed by step (h) until an end condition is satisfied.

7. A system to detect a malicious message for an instant messaging service, wherein the system is configured to:
   (a) originate a message in an instant messaging client application included in a first processing system, wherein the message comprises an entity of interest, and wherein a second processing system is a designated recipient of the message;
   (b) prior to transferring a portion of the message from the instant messaging client application, analyse, by the first processing system, the entity of interest to determine if the message is malicious, wherein a malicious entity of interest is configured to cause damage to the first processing system and the second processing system;
   (c) in response to detecting that the message is malicious, restrict the message from threatening:
      the first processing system; and
      the second processing system in data communication with the first processing system;
   (d) set the entity of interest as a base entity;
   (e) determine an entity property of the base entity;
   (f) establish at least one related entity rule based on the entity property of the base entity;
   (g) scan the first processing system to locate an entity that satisfies the at least one entity rule;
   (h) in response to locating an entity that satisfies the at least one related entity rule, classify the entity as a related entity to the base entity; and
   (i) in response to detecting that at least a portion of the message is malicious, remove the malicious portion of the message.

8. A computer program product comprising a non-transitory and tangible computer readable medium having a computer program recorded therein or thereon, the computer program enabling detection of a malicious message for an instant messaging service, wherein the computer program product configures the processing system to:
   (a) originate a message in an instant messaging client application included in a first processing system, wherein the message comprises an entity of interest, and wherein a second processing system is a designated recipient of the message;
   (b) prior to transferring a portion of the message from the instant messaging client application, analyse, by the first processing system, the entity of interest to determine if the message is malicious, wherein a malicious entity of interest is configured to cause damage to the first processing system and the second processing system;
   (c) in response to detecting that the message is malicious, restrict the message from threatening:
      the first processing system; and
      the second processing system in data communication with the first processing system;
   (d) set the entity of interest as a base entity;
   (e) determine an entity property of the base entity;
   (f) establish at least one related entity rule based on the entity property of the base entity;
   (g) scan the first processing system to locate an entity that satisfies the at least one entity rule;
   (h) in response to locating an entity that satisfies the at least one related entity rule, classify the entity as a related entity to the base entity; and
   (i) in response to detecting that at least a portion of the message is malicious, removing the malicious portion of the message.

9. A method of detecting a malicious message for an instant messaging service, wherein the method comprises:
   (a) generating, in an instant messaging client application included in a first processing system, input data for a server processing system indicative of an instruction to transfer a message to a second processing system, wherein the message comprises an entity of interest, and wherein the second processing system is a designated recipient of the message;
   (b) prior to transferring a portion of the message from the instant messaging client application, analyzing, by the first processing system, the entity of interest to be transferred to determine if the message is malicious, wherein a malicious entity of interest is configured to cause damage to the first processing system and the second processing system;
   (c) in response to detecting that the message is malicious, restricting the message from being transferred to the second processing system;
   (d) setting the entity of interest as a base entity;
   (e) determining an entity property of the base entity;
   (f) establishing at least one related entity rule based on the entity property of the base entity;
   (g) scanning the first processing system to locate an entity that satisfies the at least one entity rule;

(h) in response to locating an entity that satisfies the at least one related entity rule, classifying the entity as a related entity to the base entity; and (i) in response to detecting that at least a portion of the message is malicious, removing the malicious portion of the message.

10. The method according to claim 9, wherein the method comprises intercepting a message transferal instruction indicated by a user interacting with the first processing system.

11. The method according to claim 9, wherein the method comprises scanning textual content of the message for a networked address which is associated with malicious activity, wherein in the event that the textual content of the message comprises the networked address associated with malicious activity, the message is determined to be malicious.

12. The method according to claim 9, wherein the method comprises analysing an attached file of the message, wherein in the event that the attached file is determined to be malicious, the message is determined to be malicious.

13. The method according to claim 9, wherein restricting the message comprises at least one of:
   blocking at least a part of the message;
   alerting a user receiving the message that at least part of the message has been blocked;
   alerting a user transferring the message that at least part of the message has been blocked;
   modifying at least part of the message;
   prompting a receiving user regarding detection of a threat and requesting the user to indicate whether the message is to be received;
   closing an instant messaging session between transferring and receiving users;
   closing an instant messaging interface of at least one of the transferring and receiving users;
   blocking a transferring user from transferring future messages to the receiving user; and
   removing the transferring user from a contact list of the receiving user.

14. The method according to claim 9, wherein the method comprises:
   setting the related entities as the base entity; and
   repeating steps (e), (f), and (g), followed by step (h) until an end condition is satisfied.

15. A computer program product comprising a non-transitory and tangible computer readable medium having a computer program recorded therein or thereon, the computer program enabling detection of a malicious message for an instant messaging service, wherein the computer program product configures a processing system to:

(a) generate, by an instant messaging client application included in a first processing system, input data for a server processing system indicative of an instruction to transfer a message to a second processing system, wherein the message comprises an entity of interest, and wherein the second processing system is a designated recipient of the message;

(b) prior to transferring a portion of the message from the instant messaging client application, analyse, by the first processing system, the entity of interest to be transferred to determine if the message is malicious, wherein a malicious entity of interest is configured to cause damage to the first processing system and the second processing system;

(c) in response to detecting that the message is malicious, restrict the message from being transferred to the second processing system;

(d) set the entity of interest as a base entity;

(e) determine an entity property of the base entity;

(f) establish at least one related entity rule based on the entity property of the base entity;

(g) scan the first processing system to locate an entity that satisfies the at least one entity rule;

(h) in response to locating an entity that satisfies the at least one related entity rule, classify the entity as a related entity to the base entity; and (i) in response to detecting that at least a portion of the message is malicious, remove the malicious portion of the message.

* * * * *